US012770932B2

(12) United States Patent
Lv et al.

(10) Patent No.: US 12,770,932 B2
(45) Date of Patent: Oct. 20, 2026

(54) ELECTRICAL BOX, BATTERY, AND POWER CONSUMING DEVICE

(71) Applicant: CONTEMPORARY AMPEREX TECHNOLOGY (HONG KONG) LIMITED, Hong Kong (CN)

(72) Inventors: Juanxia Lv, Ningde (CN); Jinqing Ji, Ningde (CN); Mu Qian, Ningde (CN); Zhanyu Sun, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 769 days.

(21) Appl. No.: 18/177,452

(22) Filed: Mar. 2, 2023

(65) Prior Publication Data

US 2023/0282894 A1 Sep. 7, 2023

Related U.S. Application Data

(63) Continuation of application No. PCT/CN2021/112490, filed on Aug. 13, 2021.

(30) Foreign Application Priority Data

Sep. 30, 2020 (CN) ......................... 202022222865.6

(51) Int. Cl.
*H01M 10/42* (2006.01)
*H01M 10/48* (2006.01)
(Continued)

(52) U.S. Cl.
CPC ......... *H01M 10/425* (2013.01); *H01M 10/48* (2013.01); *H01M 10/615* (2015.04);
(Continued)

(58) Field of Classification Search
None
See application file for complete search history.

(56) References Cited

U.S. PATENT DOCUMENTS

2014/0141287 A1 5/2014 Bertucci et al.

FOREIGN PATENT DOCUMENTS

CN 103378588 A 10/2013
CN 206471638 U 9/2017
(Continued)

OTHER PUBLICATIONS

Machine translation of JP 2015130301, Jul. 2015.*
(Continued)

*Primary Examiner* — Jonathan Crepeau
(74) *Attorney, Agent, or Firm* — ANOVA LAW GROUP, PLLC

(57) ABSTRACT

An electrical box for a battery comprising a battery cell includes a box body, a current interrupter, a connector, and a switch. The current interrupter is provided in the box body and configured to be disconnected in response to overcurrent. The connector is configured to output electric energy of the battery. The switch is arranged in the box body and configured to control connection or disconnection between the battery cell and the connector. The connector is fixed to the box body, and the connector includes a first terminal and a second terminal that are configured to output the electric energy of the battery. The first terminal is electrically connected to the current interrupter, and the second terminal is electrically connected to the switch.

10 Claims, 6 Drawing Sheets

(51) Int. Cl.

| | |
|---|---|
| ***H01M 10/615*** | (2014.01) |
| ***H01M 50/204*** | (2021.01) |
| ***H01M 50/296*** | (2021.01) |
| ***H01M 50/298*** | (2021.01) |
| ***H01M 50/502*** | (2021.01) |
| ***H01M 50/583*** | (2021.01) |

(52) U.S. Cl.
CPC ....... *H01M 50/204* (2021.01); *H01M 50/296* (2021.01); *H01M 50/298* (2021.01); *H01M 50/502* (2021.01); *H01M 50/583* (2021.01); *H01M 2220/20* (2013.01)

(56) References Cited

FOREIGN PATENT DOCUMENTS

| | | | |
|---|---|---|---|
| CN | 110901417 | A | 3/2020 |
| CN | 210326048 | U | 4/2020 |
| CN | 111192983 | A | 5/2020 |
| CN | 111645618 | A | 9/2020 |
| CN | 213401436 | U | 6/2021 |
| JP | 2009004323 | A | 1/2009 |
| JP | 2011103259 | A | 5/2011 |
| JP | 5474499 | B2 | 4/2014 |
| JP | 2015130301 | A | 7/2015 |

OTHER PUBLICATIONS

Machine translation of JP 2011103259, May 2011.*
Machine translation of CN 103378588, Oct. 2013.*
IP Australia Examination report No. 2 for Application No. 2021354276 Oct. 13, 2023 4 pages.
State Intellectual Property Office of China Notice of Grant of Invention Patent Right for Application No. 202022222865.6 Mar. 26, 2021 2 pages (including translation).
Indian Patent Office Examination report for Application No. 202327026887 Nov. 16, 2023 6 pages.
The Japan Patent Office (JPO) Notification of Reasons for Refusal for Application No. 2023-501426 and Translation Feb. 20, 2024 9 Pages.
The World Intellectual Property Organization (WIPO) Written Opinion for PCT/CN2021/112490 Nov. 11, 2021 11 Pages (including translation).
The World Intellectual Property Organization (WIPO) International Search Report for PCT/CN2021/112490 Nov. 11, 2021 7 pages (including translation).
The European Patent Office (EPO) Extended Search Report for EP Application No. 21874084.3 Jul. 3, 2024 14 Pages.
Japan Patent Office (JPO) The Decision of Refusal For JP Application No. 2023-501426 Sep. 17, 2024 8 Pages (Translation Included).

* cited by examiner

ELECTRICAL BOX, BATTERY, AND POWER CONSUMING DEVICE

CROSS REFERENCE TO RELATED APPLICATIONS

The present application is a continuation of International Application No. PCT/CN2021/112490, filed on Aug. 13, 2021, which claims priority to Chinese patent application no. 2020222228656, entitled "ELECTRICAL BOX, BATTERY, AND POWER CONSUMING DEVICE", filed on Sep. 30, 2020, the entire contents of both of which are incorporated herein by reference.

TECHNICAL FIELD

The present application relates to the field of batteries, and in particular to an electrical box, a battery and a power consuming device.

BACKGROUND ART

A new energy vehicle generally operates with high-voltage power and is equipped with an electrical box to which a battery of the vehicle is electrically connected. Currently, there is a large space requirement because the electrical box is connected to a connector outputting electric energy of the battery by means of a long electrically conductive structure, such as a copper bar.

SUMMARY

The present application provides an electrical box, a battery and a power consuming device, in order to alleviate the issue of a current large space requirement for connection between an electric energy output end of the battery and the electrical box.

In a first aspect, the present application provides an electrical box for a battery comprising battery cells, the electrical box comprising a box body, a current interrupter, a first connector, and a switch. The current interrupter is arranged in the box body and configured to be disconnected in the case where a current reaches a predetermined value. The first connector is configured for outputting electric energy of the battery. The switch is arranged in the box body and configured for controlling connection or disconnection between the battery cells and the first connector. The first connector is fixed to the box body, and the first connector comprises a first terminal and a second terminal that are configured for outputting the electric energy of the battery, the first terminal being electrically connected to the current interrupter, and the second terminal being electrically connected to the switch.

In the above-mentioned technical solution, the first connector capable of outputting the electric energy of the battery and the electrical box are integrated into a module, such that there is no need to provide a long electrically conductive structure between the electrical box and the first connector, which reduces the occupied space and improves the space utilization. The current interrupter can interrupt the output of electric energy of the battery through the first connector in the case where the current reaches the predetermined value, so as to ensure electrical safety. The switch provided can electrically connect or disconnect the battery cells and the first connector as required, thereby preventing the battery from being excessively charged or discharged.

In some embodiments of the present application, the box body is provided with a first opening, and the first connector is configured to extend into the first opening for electrical connection to the switch and the current interrupter.

In the above-mentioned technical solution, the first connector extends into the first opening to be electrically connected to the switch and the current interrupter, such that the first connector is at least partially accommodated in the box body, the space in the box body is reasonably used, and the electrical box is thus more compact in terms of structure.

In some embodiments of the present application, the first connector comprises a base that covers the first opening from an outer side of the box body, the first terminal and the second terminal being fixed to the base.

In the above-mentioned technical solution, the base covers the first opening from the outer side of the box body, and can function to seal the first opening to a certain extent to prevent entry of foreign impurities in the box body which may affect the safety performance of the electrical box and causes damages to components and parts in the box body.

In some embodiments of the present application, the electrical box further comprises a first conductive member and a second conductive member, the first conductive member being connected to the first terminal at one end, and being connected to the current interrupter at the other end; and the second conductive member being connected to the second terminal at one end, and being connected to the switch at the other end.

In the above-mentioned technical solution, the first terminal and the current interrupter are connected by means of the first conductive member, and the second terminal and the switch are connected by means of the second conductive member, such that the switch and the current interrupter are arranged rationally in the box body, resulting in reasonable and full use of the space in the box body.

In some embodiments of the present application, the first conductive member and the second conductive member are both fixed in the box body, and the first connector is fixed in the box body by means of the first conductive member and the second conductive member.

In some embodiments of the present application, the electrical box further comprises: a current sensor, the current sensor being arranged in the box body, and the current sensor being arranged in a circuit between the first connector and the battery cells.

In the above-mentioned technical solution, the current sensor provided facilitates that a battery management system acquires information about electric energy transmission between the battery cell and the first connector, such that the battery management system can take a relevant strategy according to the information about electric energy transmission between the battery cell and the first connector, such as controlling the switch to electrically connect or disconnect the first connector and the battery cell.

In a second aspect, an embodiment of the present application provides a battery, comprising a case, a plurality of battery cells, and the electrical box provided by the embodiment of the first aspect. The plurality of battery cells are arranged inside the case. The electrical box is fixed inside the case.

In the above-mentioned technical solution, the first connector capable of outputting the electric energy of the battery and the electrical box are integrated into a module, such that there is no need to provide a long electrically conductive structure between the electrical box and the first connector, which reduces the occupied space and improves the space utilization. The current interrupter can interrupt the output of electric energy of the battery through the first connector in the case where the current reaches the predetermined value, so as to ensure electrical safety. The switch provided can electrically connect or disconnect the battery and the first connector as required, thereby preventing the battery from being excessively charged or discharged.

In some embodiments of the present application, the case is provided with a second opening, and the second opening is configured for the first connector to pass therethrough so as to output the electric energy of the battery outside the case through the first connector.

In the above-mentioned technical solution, the first connector passes through the case to facilitate electrical connection with an external power consuming device.

In some embodiments of the present application, the first connector comprises a base that covers the second opening from an inner side of the case, the first terminal and the second terminal being fixed to the base.

In the above-mentioned technical solution, the base of the first connector can cover the second opening from the inner side of the case, and can function to seal the first opening to a certain extent to prevent entry of foreign impurities in the box body which may affect the safety performance of the battery. In addition, after the first connector is electrically connected to the power consuming device body, a surface of the base in contact with the inner side of the case can prevent the first connector from moving out of the case through the second opening, thereby preventing damages to the electrical connection between the first connector and the battery cells due to pulling the first connector by vibrations of the power consuming device, etc.

In some embodiments of the present application, the battery further comprises: a seal arranged between the base and an inner surface of the case and surrounding the second opening, the seal being configured for achieving sealed connection between the first connector and the case.

In the above-mentioned technical solution, the seal provided provides a better sealing effect between the base and the case better.

In some embodiments of the present application, the battery further comprises: fixing members configured to pass through the case so as to be connected to the first connector to fix the first connector to the case.

In the above-mentioned technical solution, the fixing members provided enables the first connector to be stably connected to the case, such that the connection between the first connector and the case has a strong resistance to impact and vibration.

In a third aspect, an embodiment of the present application provides a power consuming device, comprising the battery provided by the embodiment in the second aspect.

In the above-mentioned technical solution, the first connector and the electrical box are integrated in the battery used by the power consuming device, such that there is no need to provide a long electrically conductive structure between the electrical box and the first connector, which reduces the occupied space and improves the space utilization. The current interrupter can interrupt the output of electric energy of the battery through the first connector in the case where the current reaches the predetermined value, so as to ensure electrical safety. The switch provided can electrically connect or disconnect the battery and the first connector as required, thereby preventing the battery from being excessively charged or discharged.

BRIEF DESCRIPTION OF THE DRAWINGS

In order to more clearly explain the technical solutions of the embodiments of the present application, the drawings being used in the embodiments will be described briefly below. It should be understood that the following drawings illustrate only some embodiments of the present application and are therefore not to be considered as a limitation on the scope thereof. For those of ordinary skill in the art, other relevant drawings can also be obtained from these drawings without any creative effort.

Figure 1:
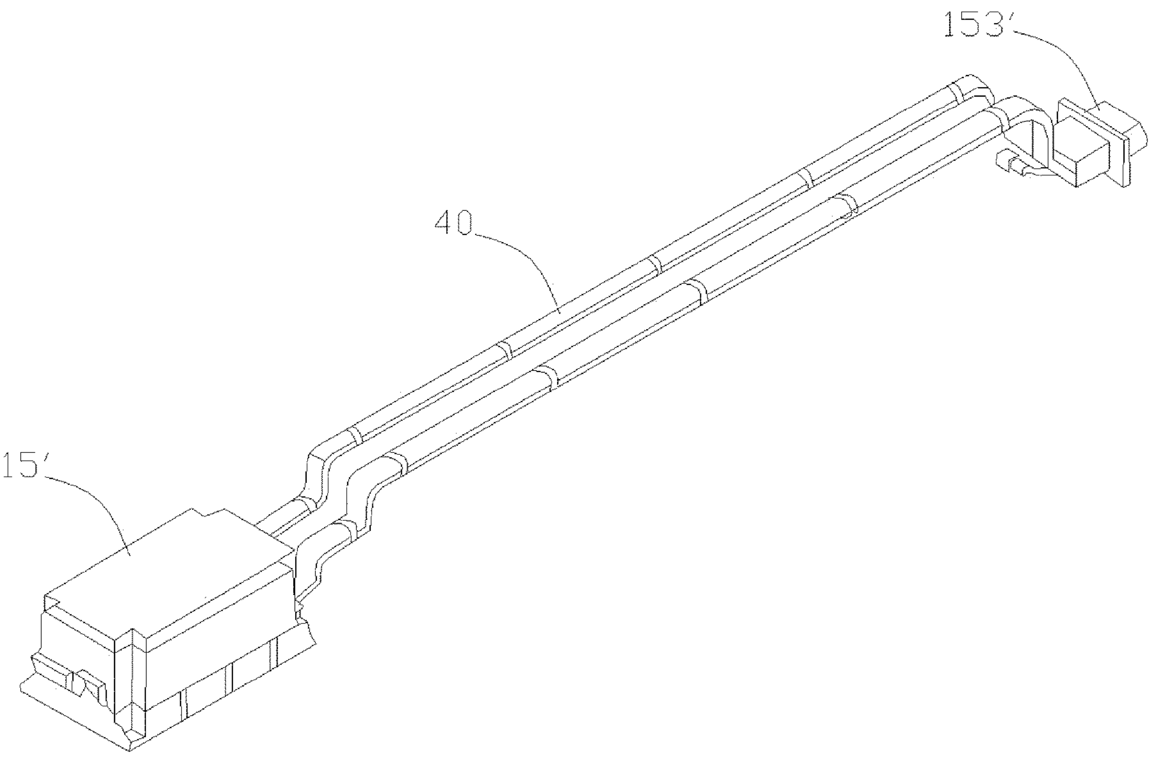
FIG. 1 is a schematic diagram showing a connection relationship between a first connector and an electrical box.

List of reference signs: 1. Power consuming device; 10. Battery; 11. Case; 111. Upper cover; 1111. Second opening; 1112. First through hole; 112. Lower cover; 13. Battery cell; 14. Power supply module; 15', 15. Electrical box; 151. Box body; 1511. First opening; 1512. Upper box body; 1513. Lower box body; 152. Current interrupter; 153',153. First connector; 1531. First terminal; 1532. Second terminal; 1533. Base; 1534. First surface; 1535. Second surface; 1536. Sealing groove; 1537. Sealing member; 154. Switch; 155. First conductive member; 156. Second conductive member; 157. Current sensor; 158. Heating relay; 159. Heating element; 160. Third conductive member; 161. Fourth conductive member; 162. Fifth conductive member; 17. Fixing member; 20. Motor; 30. Controller; 40. Electrically conductive structure.

DETAILED DESCRIPTION OF EMBODIMENTS

In order to make the objects, technical solutions and advantages of embodiments of the present application clearer, the technical solutions in the embodiments of the present application will be described clearly and completely below with reference to the accompanying drawings in the embodiments of the present application. Obviously, the embodiments described are some of, rather than all of, the embodiments of the present application. Generally, the assemblies of the embodiments of the present application described and illustrated in the drawings herein may be arranged and designed in a variety of different configurations.

Thus, the following detailed description of the embodiments of the present application provided in the drawings is not intended to limit the scope of the present application as claimed, but is merely representative of the selected embodiments of the present application. All the other embodiments obtained by those of ordinary skill in the art based on the embodiments of the present application without creative efforts shall fall within the scope of protection of the present application.

It should be noted that the embodiments in the present application and characteristics in the embodiments may be combined with each other without conflicts.

It should be noted that like numerals and letters refer to like items in the following figures, so once an item is defined in one figure, it does not require further definition and explanation in subsequent figures.

In the description of the embodiments of the present application, it should be noted that the indicated orientation or position relationship is based on the orientation or position relationship shown in the figures, or is an orientation or position relationship of customary arrangement of the product of the present application in use, or an orientation or position relationship customarily understood by those skilled in the art, or an orientation or position relationship of customary arrangement of the product of the present application in use, and is merely for ease of description of the present application and simplification of the description, rather than indicating or implying that apparatuses or elements referred to must have a specific orientation or be constructed and operated in a specific orientation, and therefore cannot be construed as limiting the present application. In addition, the terms "first", "second", "third", etc. are merely used for distinct description, and shall not be construed as indicating or implying relative importance.

In the related art, as shown in FIG. 1, an electrical box 15' is fixed in a case of a battery, but is connected to a first connector 153' outputting electric power of the battery by means of a long electrically conductive structure 40, which results in a large space requirement for the connection between the first connector 153' and the electrical box 15' and also increases the size of the case of the battery, so the cost is high, and an occupied space is large.

An embodiment of the present application provides a power consuming device 1 using a battery 10 as a power source. The power consuming device 1 may be, but is not only limited to, a vehicle, a ship, a spacecraft, etc.

Figure 2:
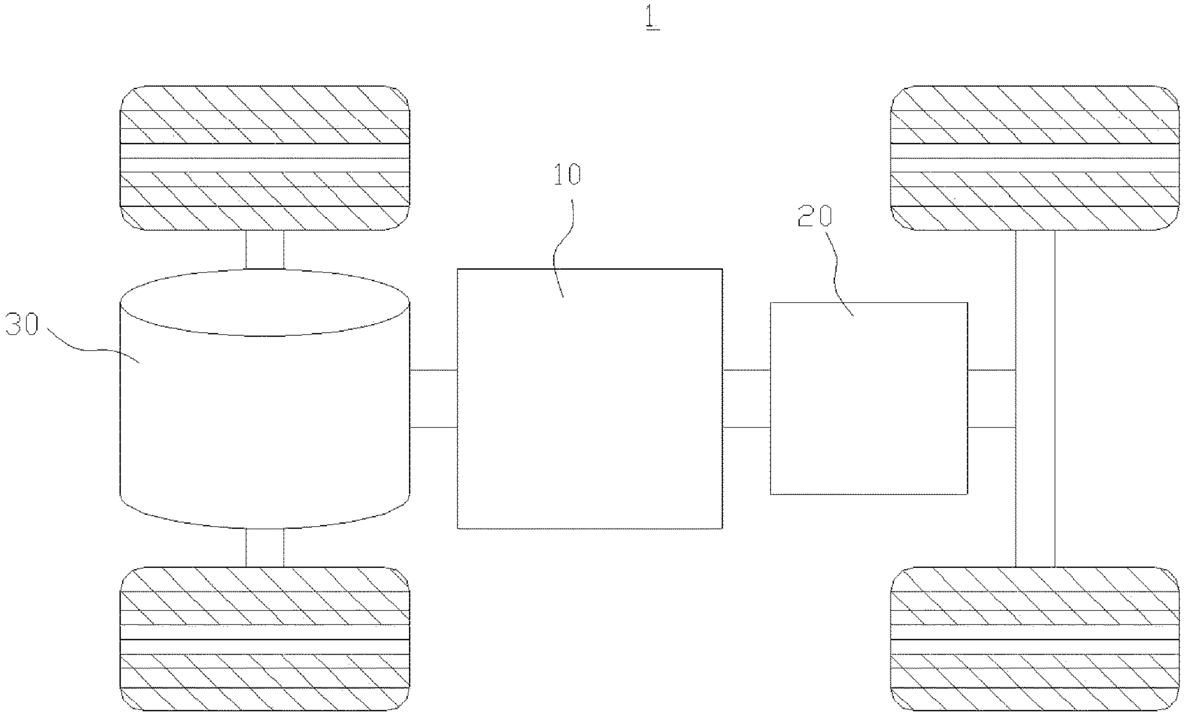
FIG. 2 is a schematic diagram of a power consuming device according to an embodiment of the present application.

In an embodiment of the present application, the power consuming device 1 is a vehicle. As shown in FIG. 2, which is a schematic structural diagram of a vehicle according to an embodiment of the present application, the vehicle may be a fuel vehicle, a gas vehicle or a new energy vehicle. The new energy vehicle may be a battery electric vehicle, a hybrid vehicle, an extended-range vehicle, etc. The vehicle may be internally provided with a motor 20, a controller and a battery 10. The controller 30 is configured for controlling the battery 10 to supply power to the motor 20. For example, the battery 10 may be provided at the bottom or the head or the tail of the vehicle. The battery 10 may be configured to supply power to the vehicle. For example, the battery 10 can serve as a power source for operating the vehicle for use in a circuit system of the vehicle, for example, to meet the working power demand of the vehicle during startup, navigation and traveling. In another embodiment of the present application, the battery 10 can not only serve as a power source for operating the vehicle, but also serve as a power source for driving the vehicle, replacing or partially replacing fuel or natural gas, to provide driving power for the vehicle.

Figure 3:
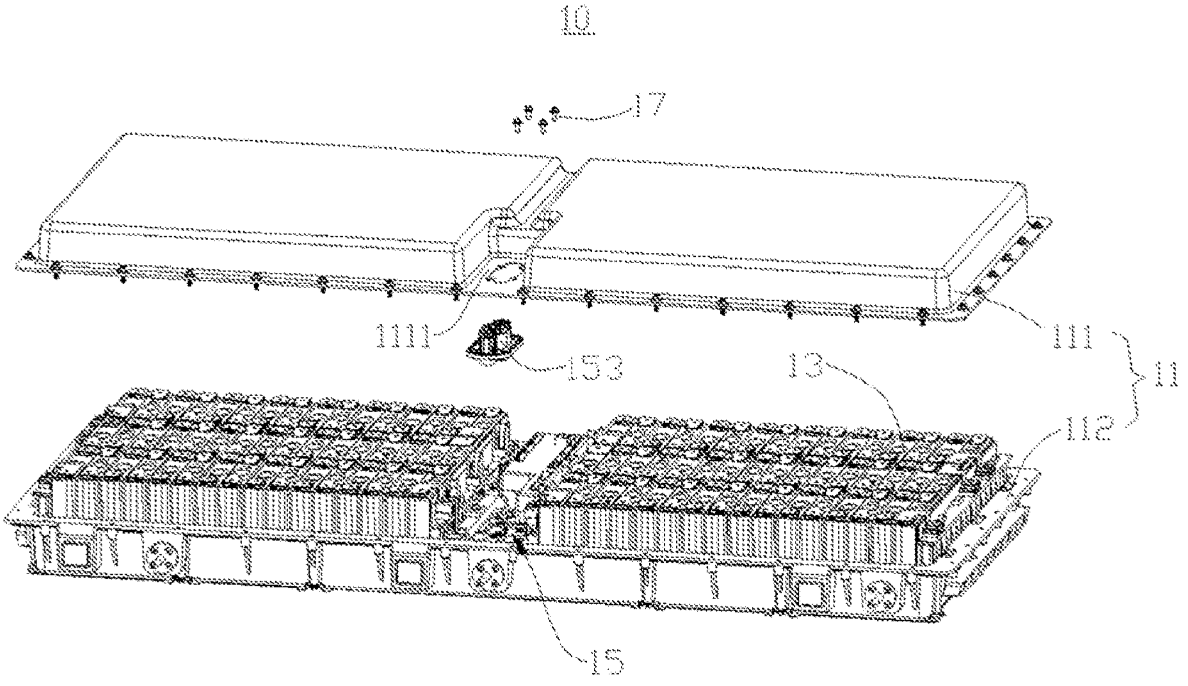
FIG. 3 is a schematic diagram of a battery according to an embodiment of the present application.

As shown in FIG. 3, the battery 10 comprises a case 11, battery cells 13 and an electrical box 15. The electrical box 15 is fixed inside the case 11. The battery cells 13 are arranged inside the case 11.

In some embodiments, a plurality of battery cells 13 are provided, the plurality of battery cells 13 refer to two or more battery cells 13, the battery cells 13 are connected in series and/or in parallel, the plurality of battery cells 13 are connected in series and/or in parallel to form a power supply module, the power supply module has a first output electrode and a second output electrode, and the first output electrode and the second output electrode have opposite polarities.

In some embodiments, one battery cell 13 may also be provided, and in this case, the power supply module is formed by one battery cell 13, and the first output electrode and the second output electrode are two electrodes of the battery cell 13 that have opposite polarities.

The battery cells 13 is electrically connected to a power consuming device body (e.g., the motor 20) by means of a first connector 153 to transmit electric energy of the battery 10 to the power consuming device 1 through the first connector 153.

Figure 4:
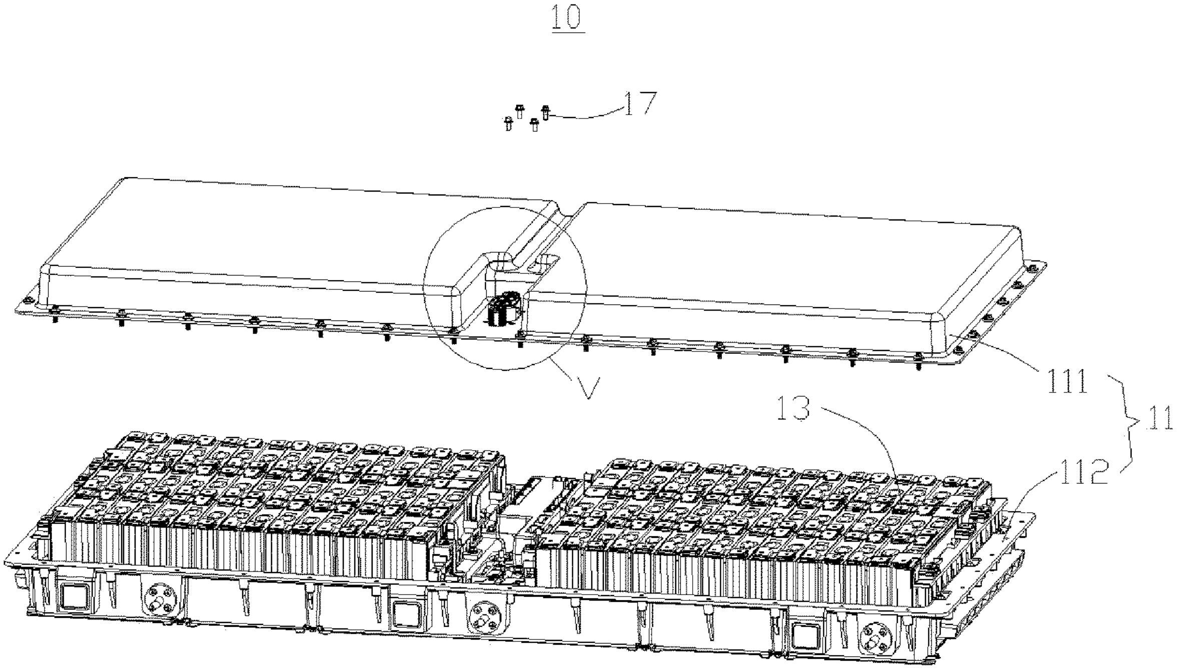
FIG. 4 is a schematic diagram of a first connector passing through a second opening according to an embodiment of the present application.
Figure 5:
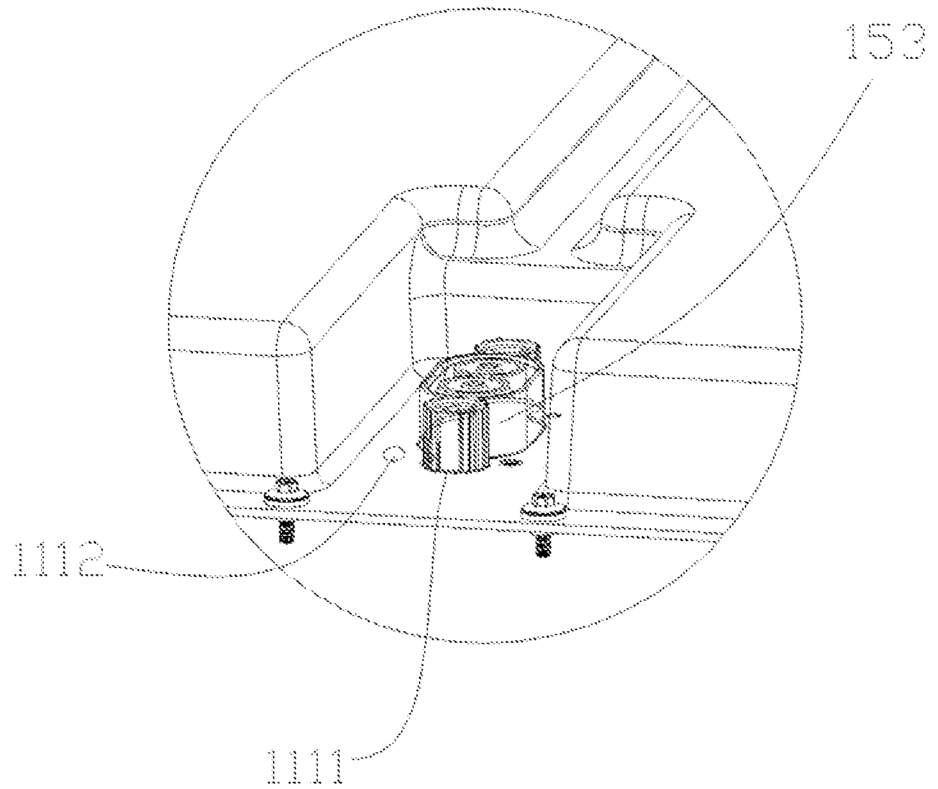
FIG. 5 is an enlarged view of part V in FIG. 4.
Figure 6:
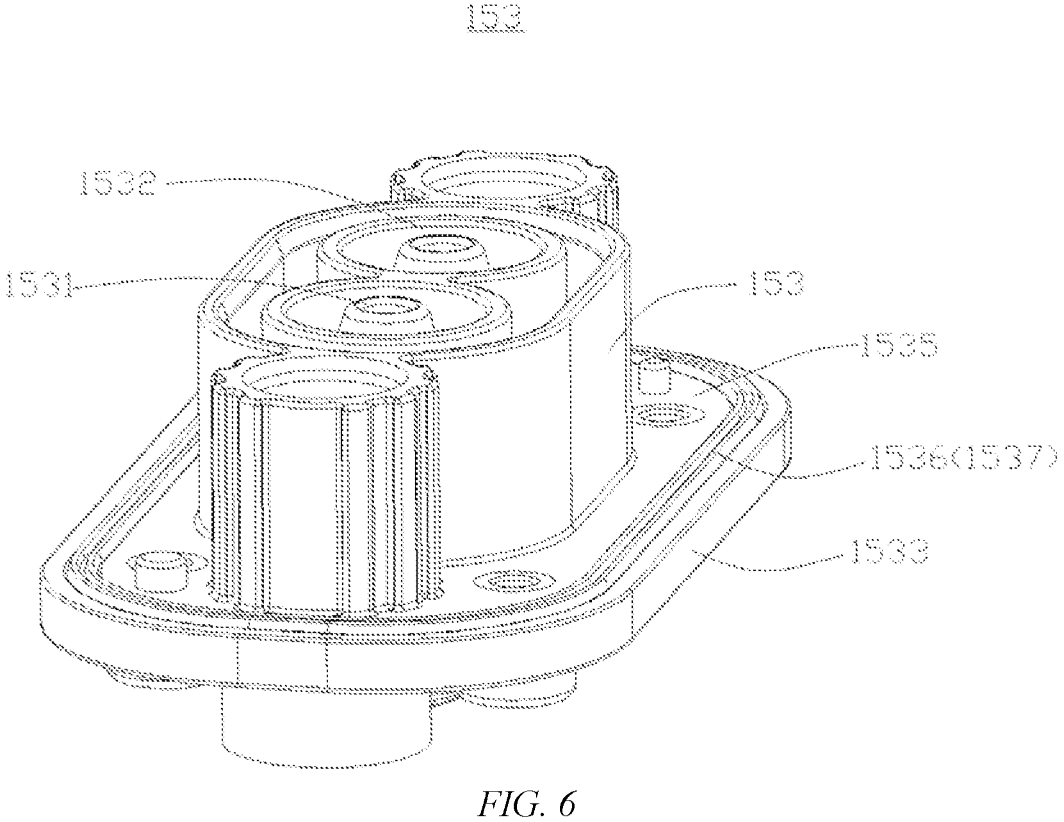
FIG. 6 is a schematic diagram of a first connector from a first perspective according to an embodiment of the present application.

As shown in FIGS. 4, 5, and 6, the case 11 is provided with a second opening 1111, the second opening 1111 being used for passing the first connector 153 therethrough so as to output the electric energy of the battery cells 13 outside the case 11 through the first connector 153.

In some embodiments, the case 11 comprises an upper cover 111 and a lower housing 112, the second opening 1111 being formed in the upper cover 111, and a first terminal 1531 and a second terminal 1532 of the first connector 153 extending from the interior of the case 11 to the outside of the case 11 so that the first terminal 1531 and the second terminal 1532 can be in butt joint with the power consuming device body to output the electric energy of the battery cells 13 to the power consuming device body through the first connector 153. The first connector 153 extends from the case 11 so as to transmit the electric energy of the battery cells 13 to the power consuming device body outside the case 11, such that the first connector 153 is at least partially accommodated in the case 11, the space inside the case 11 can be used as much as possible, and the external space occupied by the first connector 153 is reduced, and a structure between the power consuming device body and the battery 10 is more compact.

In some embodiments, the first terminal 1531 and the second terminal 1532 can extend from the interior of the case 11 to the outside of the case 11, and after the first terminal 1531 and the second terminal 1532 extend from the case 11 through the second opening 1111, a second surface 1535 of a base 1533 covers the second opening 1111 from an inner side of the case 11 and can function to seal the second opening 1111 to a certain extent to prevent foreign impurities from entering the case 11 and thus affecting the safety performance of the battery 10. In addition, after the first connector 153 is electrically connected to the power consuming device body, a surface of the base 1533 in contact with the inner side of the case 11 can prevent the first connector 153 from moving out of the case 11 through the second opening 1111, thereby preventing damages to the electrical connection between the first connector 153 and the battery cells 13 due to pulling the first connector 153 by vibrations of the power consuming device 1, etc.

In order to further improve the sealing performance between the case 11 and the base 1533, the battery 10 further comprises a seal 1537, the seal 1537 being arranged between the base 1533 and the inner surface of the case 11 and surrounding the second opening 1111 for achieving a sealed connection between the first connector 153 and the case 11.

In some embodiments, the second surface 1535 of the base 1533 is provided with a sealing groove 1536, the sealing groove 1536 surrounds the second opening 1111, the sealing groove 1536 matches the base 1533 in contour, and the sealing member 1537 is arranged in the sealing groove 1536. When the first connector 153 passes through the second opening 1111, the sealing member 1537 abuts against a lower surface of the upper cover 111 from bottom to top so as to achieve a seal between the first connector 153 and the case 11. The sealing member 1537 is arranged in the case 11 and can prevent sealing failure caused by external abrasion, corrosion, etc. Furthermore, the sealing member 1537 is provided arranged the case 11 to prevent the sealing member 1537 from occupying the space outside the case 11, and the arrangement of the sealing member 1537 surrounding the second opening 1111 resulting in a better sealing performance thereof.

In some embodiments, the sealing groove 1536 may also be provided in the inner surface of the upper cover 111, and the sealing member 1537 may be arranged in the sealing groove 1536 of the upper cover 111, such that when the first connector 153 passes through the second opening 1111, the first connector 153 abuts against the sealing member 1537 from bottom to top so as to achieve a seal between the first connector 153 and the case 11. The material of the sealing member 1537 may be selected from acrylonitrile-butadiene rubber, silicone, nylon, etc.

In some embodiments, it is also possible to achieve the sealed connection between the first connector 153 and the case 11 in other manners.

In order to ensure a stable and reliable connection relationship between the first connector 153 and the case 11, in some embodiments, the battery 10 further comprises fixing members 17, the fixing members 17 being configured to pass through first through holes 1112 formed in the case 11 for connection to the first connector 153, thereby fixing the first connector 153 to the case 11. The fixing members 17 may be bolts, screws, etc. The first connector 153 is fixed to the case 11 by means of the fixing members 17, such that the first connector 153 may not move relative to the case 11, a stable connection relationship can be kept between the first connector 153 and the battery cells 13, and between the first connector 153 and the power consuming device body, and the connection between the first connector 153 and the case 11 has a strong resistance to impact and vibration.

Figure 7:
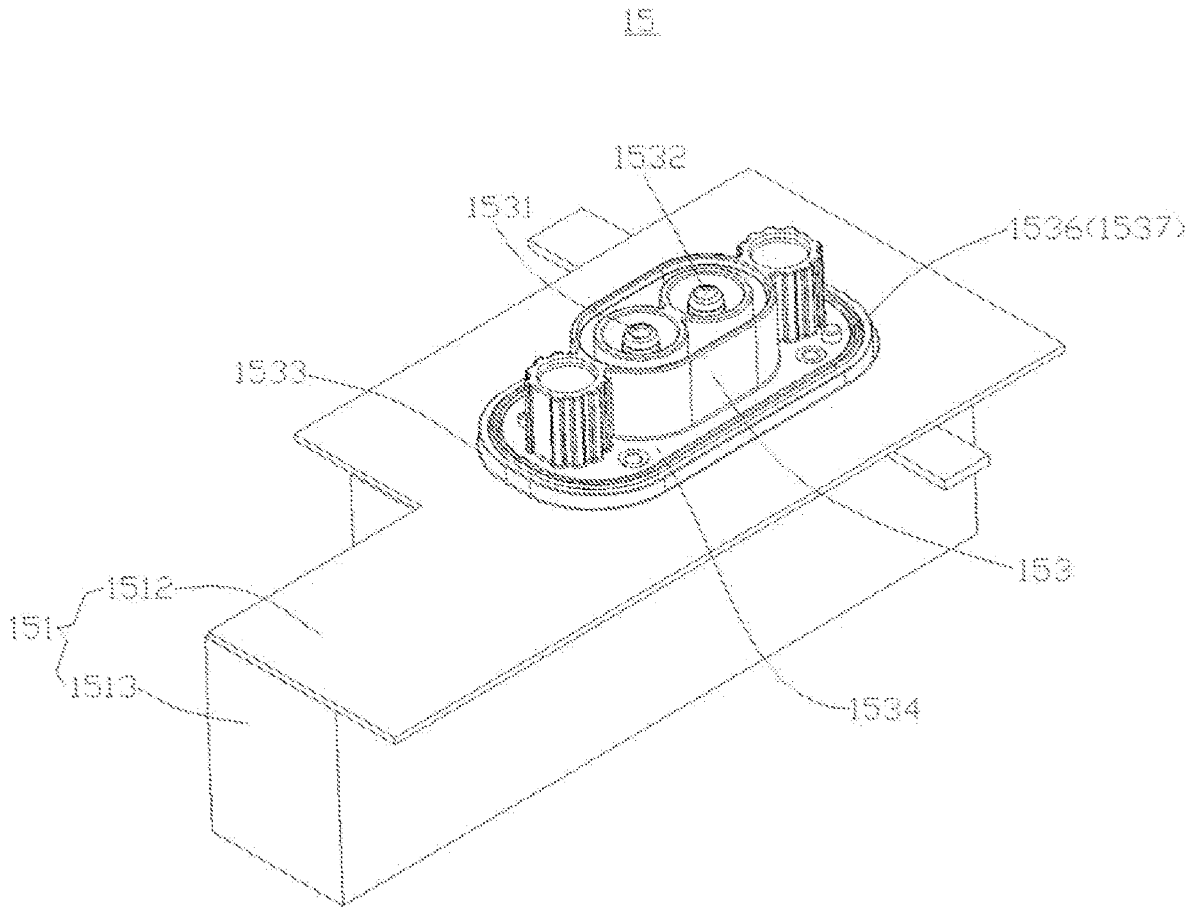
FIG. 7 is a schematic diagram of an electrical box according to an embodiment of the present application.
Figure 8:
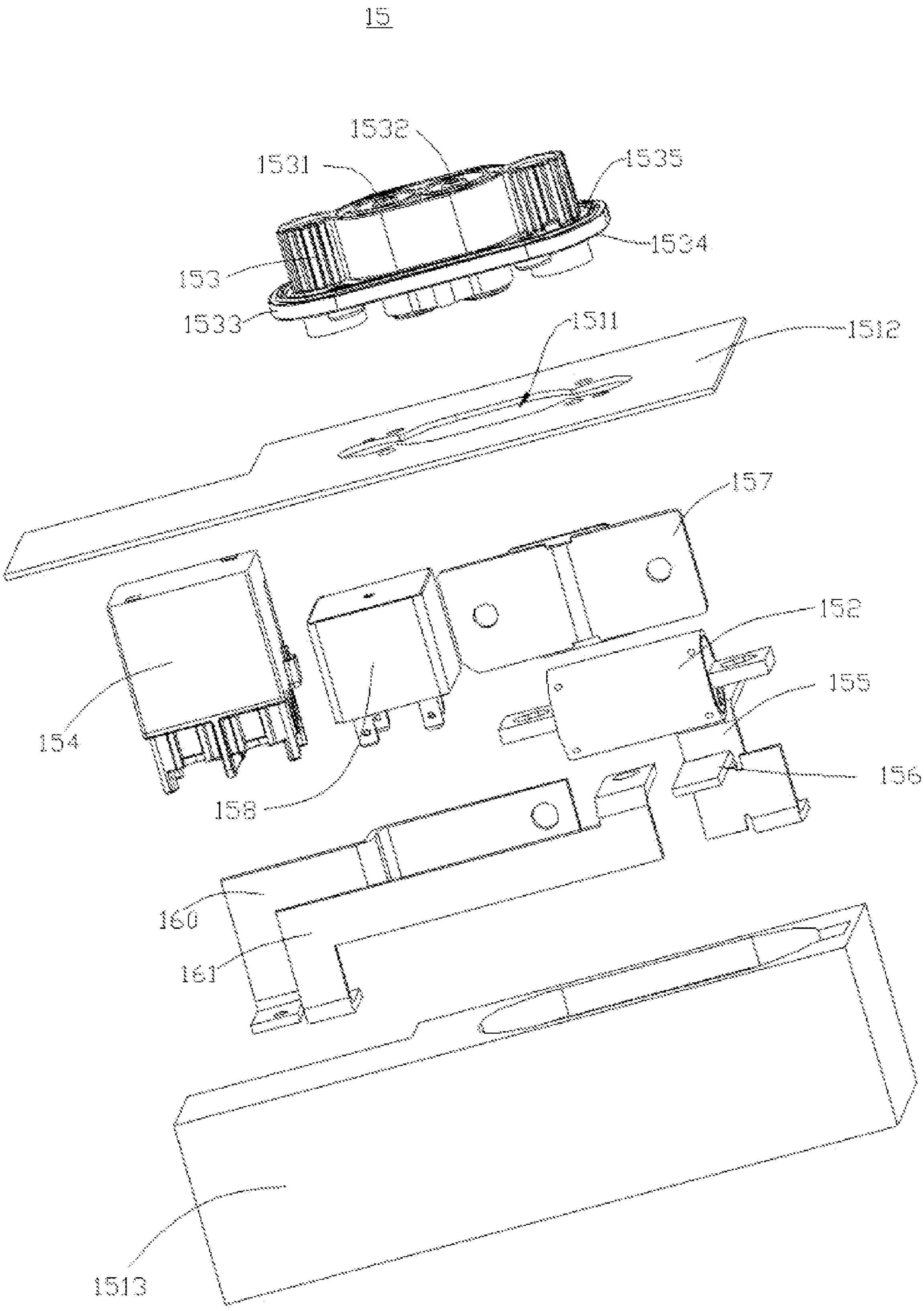
FIG. 8 is an exploded view of the electrical box according to an embodiment of the present application.

As shown in FIGS. 7 and 8, an embodiment of the present application provides an electrical box 15, the electrical box 15 comprising a box body 151, a current interrupter 152, the first connector 153, and a switch 154. The current interrupter 152 is arranged in the box body 151 and is configured to be disconnected in the case where a current reaches a predetermined value. The first connector 153 is configured for outputting electric energy of the battery cells 13. The switch 154 is arranged in the box body 151 and configured for controlling connection or disconnection between the battery cells 13 and the first connector 153. The first connector 153 is fixed to the box body 151, the first connector 153 comprises the first terminal 1531 and the second terminal 1532 for outputting the electric energy of the battery cells 13, the first terminal 1531 being electrically connected to the current interrupter 152, and the second terminal 1532 being electrically connected to the switch 154. The first connector 153 capable of outputting the electric energy of the battery cells 13 and the box body 151 of the electrical box 15 are integrated into a module, such that there is no need to provide a long electrically conductive structure 40 between the electrical box 15 and the first connector 153, which reduces the cost and occupied space and improves the space utilization.

In some embodiments, the current interrupter 152 can interrupt output of the electric energy of the battery cells 13 through the first connector 153 in the case where the current reaches the predetermined value so as to ensure electrical safety.

The switch 154 provided can electrically connect or disconnect the battery cells 13 and the first connector 153 as required, thereby preventing the battery cells 13 from being excessively charged or discharged. In some embodiments, the switch 154 is a relay.

Figure 9:
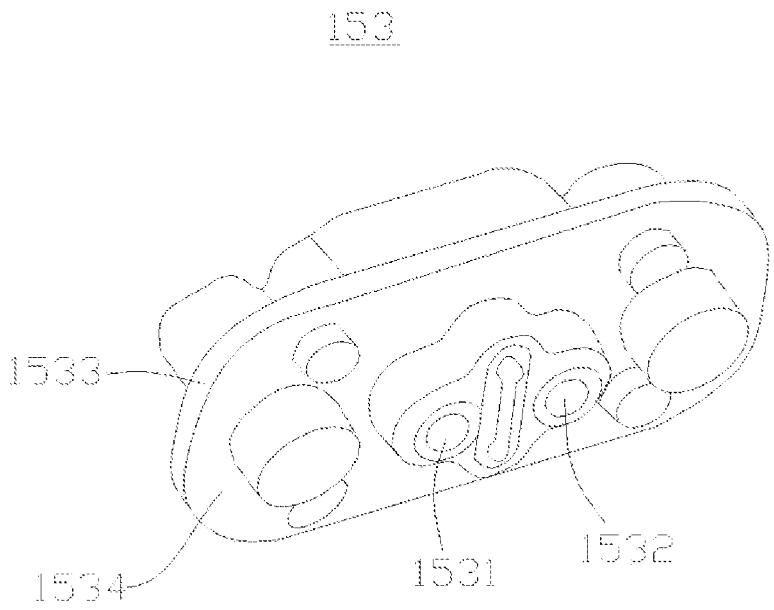
FIG. 9 is a schematic diagram of the first connector from a second perspective according to an embodiment of the present application.
Figure 10:
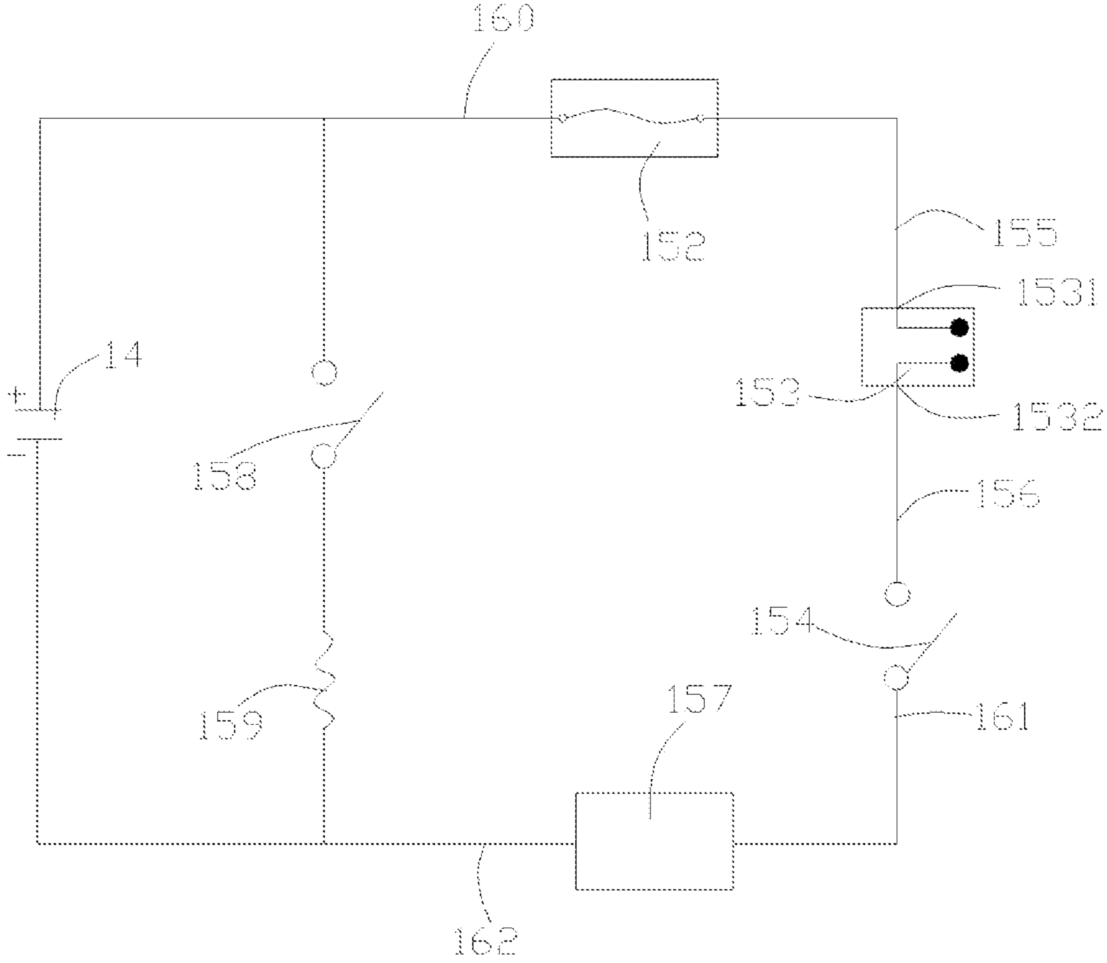
FIG. 10 is a circuit diagram of the electrical box according to an embodiment of the present application.

As shown in FIGS. 9 and 10, in some embodiments, the first connector 153 comprises the first terminal 1531, the second terminal 1532, and the base 1533, the first terminal 1531 and the second terminal 1532 being fixed to the base 1533, the first opening 1511 is formed in the box body 151, and the first connector 153 is configured to extend into the first opening 1511 in order to be electrically connected to the switch 154 and the current interrupter 152.

The base 1533 has the first surface 1534 and the second surface 1535 that are opposite, wherein the first surface 1534 and the second surface 1535 are two oppositely arranged surfaces of the base 1533.

The box body 151 comprises an upper box body 1512 and a lower box body 1513, the upper box body 1512 and the lower box body 1513 being connected to form the box body 151. The first opening 1511 is provided in the upper box body 1512, and the first terminal 1531 and the second terminal 1532 extend into the first opening 1511 from an outer side of the upper box body 1512, such that the first connector 153 is at least partially accommodated in the box body 151, and the space in the box body 151 is reasonably used, the electrical box 15 is more compact in terms of structure, and the space outside the box body 151 occupied by the first connector 153 is reduced.

After the first terminal 1531 and the second terminal 1532 extend into the first opening 1511, the first surface 1534 of the base 1533 covers the first opening 1511 from the outer side of the box body 151 and abuts against the upper surface of the upper box body 1512, and can function to seal the first opening 1511 to a certain extent to prevent entry of foreign impurities in the box body 151 which may affect the safety performance of the electrical box 15 and causes damages to components and parts in the box body 151. Furthermore, when the first connector 153 is in butt joint with a second connector for the power consuming device body, the second connector has a reaction force against the first connector 153, and since the first surface 1534 of the base 1533 abuts against the upper box body 1512 of the box body 151, the upper box body 1512 can provide a support acting point for the first connector 153 such that the first connector 153 can complete butt joint with the second connector.

In some embodiments, the electrical box 15 further comprises a first conductive member 155 and a second conductive member 156. The first conductive member 155 is connected to the first terminal 1531 at one end, and is connected to the current interrupter 152 at the other end; and the second conductive member 156 is connected to the second terminal 1532 at one end, and is connected to the switch 154 at the other end. The first conductive member 155 and the second conductive member 156 are both fixed to the box body 151, and the first connector 153 is fixed to the box body 151 by means of the first conductive member 155 and the second conductive member 156.

The electrical box 15 further comprises a current sensor 157, the current sensor 157 being arranged in the box body 151, and the current sensor 157 being arranged in a circuit between the first connector 153 and the battery cells 13. The provision of the current sensor 157 facilitates acquiring current information of a branch where the battery cells 13 and the first connector 153 are located.

In some embodiments, as shown in FIG. 10, the electrical box 15 further comprises a heating relay 158, wherein the heating relay 158 is arranged in a heating branch, a heating element 159 is provided in the heating branch, the heating element 159 is connected to each of a first output electrode and a second output electrode of the plurality of battery cells 13, and the heating relay 158 is configured for controlling the connection or disconnection between the heating element 159 and the battery cells 13. The heating branch is in parallel connection with a branch where the switch 154 and the current interrupter 152 are located, and is configured for controlling the heating element 159 to heat other components, for example, in the case where normal operations of the battery 10 are affected by a low ambient temperature, the heating branch controls the heating element 159 to heat the interior of the battery 10 so as to maintain the temperature inside the battery within a range that can meet the normal operations of the battery 10. Of course, the heating branch can also be used for other purposes.

The current sensor 157 may be installed at any position in the branch where the first connector 153 and the switch 154 are located. In some embodiments, a first output electrode of the power supply module 14 is a positive electrode, a second output electrode of the power supply module 14 is a negative electrode, the first terminal 1531 of the first connector 153 is a positive electrode connecting terminal, the second terminal 1532 of the first connector 153 is a negative electrode connecting terminal, the first terminal 1531 is connected to the current interrupter 152 by means of the first conductive member 155, and the second terminal 1532 is connected to the switch 154 by means of the second conductive member 156. The current interrupter 152 is connected to the first output electrode by means of a third conductive member 160. The switch 154 is connected to the current sensor 157 by means of a fourth conductive member 161, and the current sensor 157 is connected to the second output electrode by means of a fifth conductive member 162.

The first conductive member 155, the second conductive member 156, the third conductive member 160, the fourth conductive member 161, and the fifth conductive member 162 are all copper bars.

In some embodiments, the current sensor 157 may be mounted between the first output electrode and the current interrupter 152, between the current interrupter 152 and the first connector 153, or between the first connector 153 and the switch 154.

The foregoing descriptions are merely some embodiments of the present application, and are not intended to limit the present application. For those skilled in the art, the present application may have various modifications and variations. Any modifications, equivalent substitutions, improvements, etc. made within the spirit and principle of the present application should be included within the scope of protection of the present application.

The invention claimed is:

1. A battery, comprising:

a case;

a battery cell arranged inside the case; and an electrical box fixed inside the case and comprising:

a box body;

a current interrupter arranged in the box body and configured to be disconnected in response to a current reaching a predetermined value;

a connector configured to output electric energy of the battery;

a switch arranged in the box body and configured to control connection or disconnection between the battery cell and the connector; and a heating branch in parallel connection with a branch where the switch and the current interrupter are located, the heating branch comprising a heating element and a heating relay configured to control connection or disconnection between the heating element and the battery cell;

wherein the connector is fixed to the box body, and the connector comprises a first terminal and a second terminal that are configured to output the electric energy of the battery, the first terminal being electrically connected to the current interrupter, and the second terminal being electrically connected to the switch.

2. The battery according to claim 1, wherein the box body is provided with an opening, and the connector is configured to extend into the opening for electrical connection to the switch and the current interrupter.

3. The battery according to claim 2, wherein the connector further comprises a base that covers the opening from an outer side of the box body, the first terminal and the second terminal being fixed to the base.

4. The battery according to claim 1, wherein the electrical box further comprises:

a first conductive member, one end of the first conductive member being connected to the first terminal, and another end of the first conductive member being connected to the current interrupter; and a second conductive member, one end of the second conductive member being connected to the second terminal, and another end of the second conductive member being connected to the switch.

5. The battery according to claim 4, wherein the first conductive member and the second conductive member are both fixed to the box body, and the connector is fixed to the box body via the first conductive member and the second conductive member.

6. The battery according to claim 1, wherein the electrical box further comprises:

a current sensor, the current sensor being arranged in the box body, and the current sensor being arranged in a circuit between the connector and the battery cell.

7. The battery according to claim 1, wherein the case is provided with an opening, and the opening is configured for the connector to pass therethrough to allow the connector to output the electric energy of the battery outside the case.

8. The battery according to claim 7, wherein the connector further comprises a base that covers the opening from an inner side of the case, the first terminal and the second terminal being fixed to the base.

9. The battery according to claim 8, further comprising:

a seal arranged between the base and an inner surface of the case and surrounding the opening, the seal being configured to achieve sealed connection between the connector and the case.

10. The battery according to claim 1, further comprising:

a fixing member configured to pass through the case so as to be connected to the first connector to fix the first connector to the case.

* * * * *